US011597516B1

(12) United States Patent
Klinkmueller et al.

(10) Patent No.: US 11,597,516 B1
(45) Date of Patent: Mar. 7, 2023

(54) AIRBORNE MULTI-ROTOR DELIVERY SYSTEM

(71) Applicant: U.S. Government as Represented by the Secretary of the Army, Dover, NJ (US)

(72) Inventors: Kurt Klinkmueller, Newport News, VA (US); Anthony Wieck, Columbus, GA (US); Andrew Valentine, Potomac, MD (US); Joshua Holt, Copperas Cove, TX (US); James Bluman, West Point, NY (US); Andrew Kopeikin, Norwood, MA (US); Ekaterina Kuhlwein, Shrewsbury, MA (US); Abdul Halim Abdul Rahim, Picatinny Arsenal, NJ (US); Ronald Tobin, Fairbanks, AR (US); Nena Riccoboni, Picatinny Arsenal, NJ (US); Seth Jackson, Picatinny Arsenal, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/859,372

(22) Filed: Apr. 27, 2020

Related U.S. Application Data

(60) Provisional application No. 62/838,404, filed on Apr. 25, 2019.

(51) Int. Cl.
*B64D 1/12* (2006.01)
*B64C 39/02* (2023.01)

(52) U.S. Cl.
CPC .............. *B64D 1/12* (2013.01); *B64C 39/024* (2013.01); *B64C 2201/027* (2013.01); *B64C 2201/082* (2013.01); *B64C 2201/128* (2013.01); *B64C 2201/141* (2013.01); *B64C 2201/206* (2013.01)

(58) Field of Classification Search
CPC ... B64D 1/12; B64C 39/024; B64C 2201/027; B64C 2201/082; B64C 2201/128; B64C 2201/141; B64C 2201/206
See application file for complete search history.

(56) References Cited

U.S. PATENT DOCUMENTS

| | | | | |
|---|---|---|---|---|
| 9,284,062 | B2 * | 3/2016 | Wang | B64F 3/00 |
| 10,800,524 | B2 * | 10/2020 | Benezra | B64F 1/222 |
| 2003/0222173 | A1 * | 12/2003 | McGeer | B64C 39/024 244/116 |
| 2009/0026319 | A1 * | 1/2009 | Strong | B64D 17/74 244/152 |
| 2015/0175276 | A1 * | 6/2015 | Koster | B64F 1/32 244/114 R |
| 2015/0266578 | A1 * | 9/2015 | Elkins | B64D 1/12 244/137.1 |

(Continued)

*Primary Examiner* — Justin M Benedik
(74) *Attorney, Agent, or Firm* — John P. DiScala

(57) ABSTRACT

An airborne delivery system employs unmanned aerial vehicles (UAVs) released from an airborne platform, such as a Joint Precision Airdrop System (JPAD), to more accurately deliver supplies. The airborne delivery system is configured to be mounted on a JPAD, or similar airborne platform. As with a conventional JPAD, the JPAD is then released from an airborne vehicle. After a certain amount of flight time, one or more UAVs are released mid-flight from the airborne delivery system.

16 Claims, 15 Drawing Sheets

(56) References Cited

U.S. PATENT DOCUMENTS

| | | | |
|---|---|---|---|
| 2017/0038780 A1* | 2/2017 | Fandetti | G06Q 10/083 |
| 2019/0077519 A1* | 3/2019 | Husain | B64C 39/024 |
| 2019/0270526 A1* | 9/2019 | Hehn | B60L 53/18 |
| 2019/0367185 A1* | 12/2019 | Zambelli | B64F 1/00 |

* cited by examiner

AIRBORNE MULTI-ROTOR DELIVERY SYSTEM

CROSS-REFERENCE TO RELATED APPLICATIONS

This application claims the benefit under 35 USC 119(e) of U.S. provisional patent application 62/838,404 filed Apr. 25, 2019.

STATEMENT OF GOVERNMENT INTEREST

The inventions described herein may be manufactured, used and licensed by or for the United States Government.

FIELD OF THE INVENTION

The invention relates in general to delivery systems and in particular to aerial delivery systems.

BACKGROUND OF THE INVENTION

Aerial supply has long been used to deliver supplies to areas inaccessible by other land or naval vehicles. In particular, aerial supply has been a vital component of many military and humanitarian operations. Use in the commercial sector is also bound to expand as businesses contemplate aerial delivery of goods and services.

In military applications, aerial supply allows military personnel to operate cut off from a logistics base in hostile or inaccessible terrain. Autonomous aerial resupply systems can expedite sustainment operations and minimize soldiers' exposure to risk.

The Joint Precision Airdrop System (JPADS) is an autonomous airborne payload delivery system currently used by the United States Army that consists of a steerable canopy, a guidance unit and a payload. Though reliable, the JPADS is only accurate in delivering supplies to within a large radius of a specified target.

A need exists for an autonomous aerial delivery system which is more accurate than conventional aerial supply systems.

SUMMARY OF INVENTION

One aspect of the invention is an aerial delivery system comprising a dispenser assembly released from an airborne pallet. Within the housing is one or more unmanned aerial vehicles which are controllably released from the housing.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

An airborne delivery system employs unmanned aerial vehicles (UAVs) released from an airborne platform, such as a Joint Precision Airdrop System (JPAD), to more accurately deliver supplies. The airborne delivery system is configured to be mounted on a JPAD, or similar airborne platform. As with a conventional JPAD, the JPAD is then released from an airborne vehicle. After a certain amount of flight time, one or more UAVs are released mid-flight from the airborne delivery system.

By incorporating unmanned aerial vehicles into conventional airborne delivery systems, the target radius may be reduced to 5 meters or less. In addition, the unmanned aerial vehicles may further increase the range of an airborne delivery system thereby allowing pilots to drop the supplies a further distance from the target area.

Figure 1:
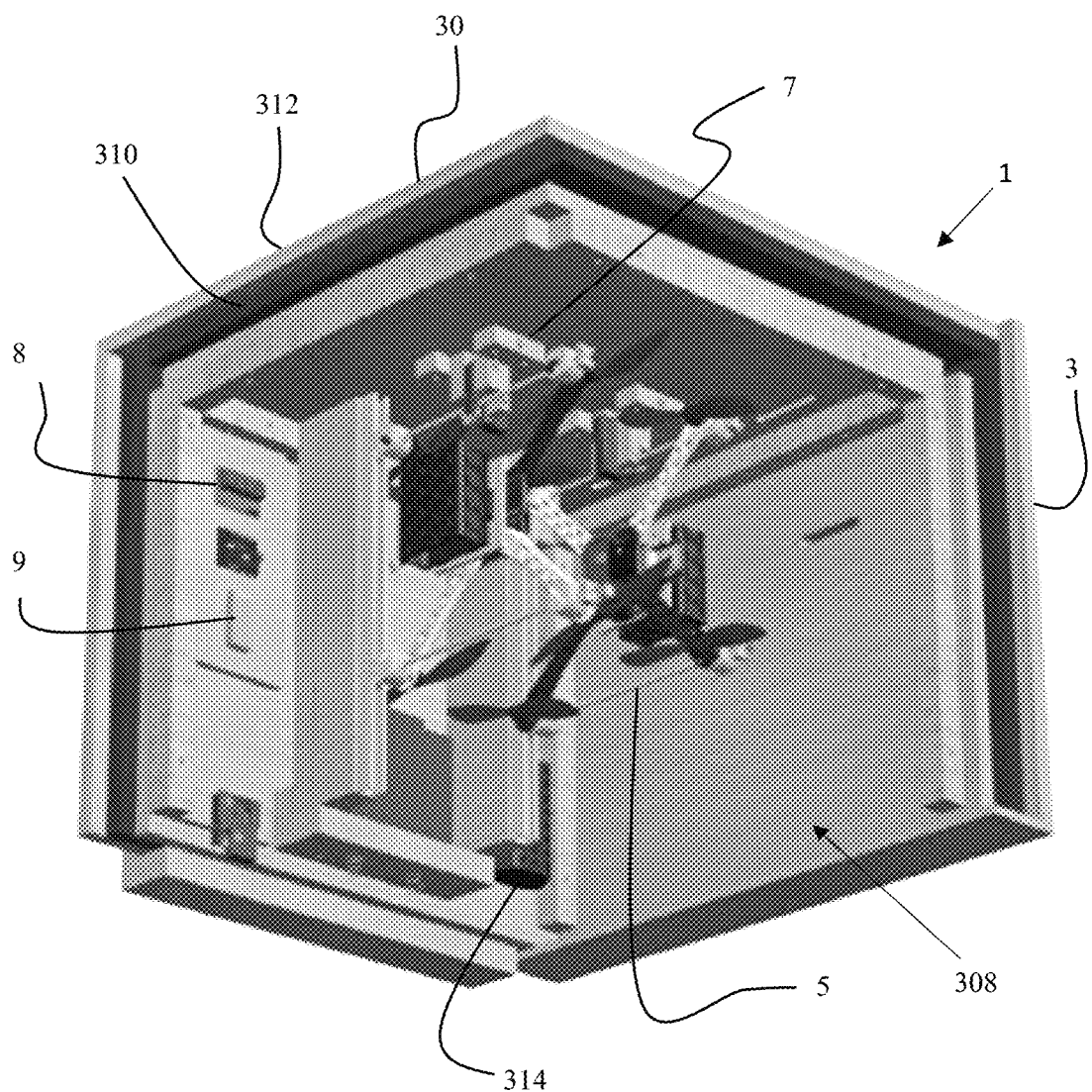
FIG. 1 is a partial cutaway view of the airborne supply system, according to one illustrative embodiment.

FIG. 1 is a partial cutaway view of the airborne supply system, according to one illustrative embodiment. The airborne supply system 1 is shown with a bottom surface and two side surfaces of a dispenser cutaway to show the interior of the dispenser. The airborne supply system 1 comprises a dispenser assembly 3 and one or more unmanned aerial vehicles (UAVs) 5. The dispenser assembly 3 is mounted to an airborne platform. Throughout this description, the airborne platform is referred to as a JPAD; however, this is for illustrative purposes. The airborne platform is not limited to a JPAD and may include other airborne platforms.

One or more UAVs 5 are mounted within the dispenser assembly 3. The dispenser assembly 3 provides a housing to safely store and protect the UAVs 5 from the external environment. The UAVs 5 are mounted such that upon a condition, either preset for autonomous operation or remotely operated, the UAVs 5 may be released from the dispenser assembly 3 to independently navigate.

Figure 2:
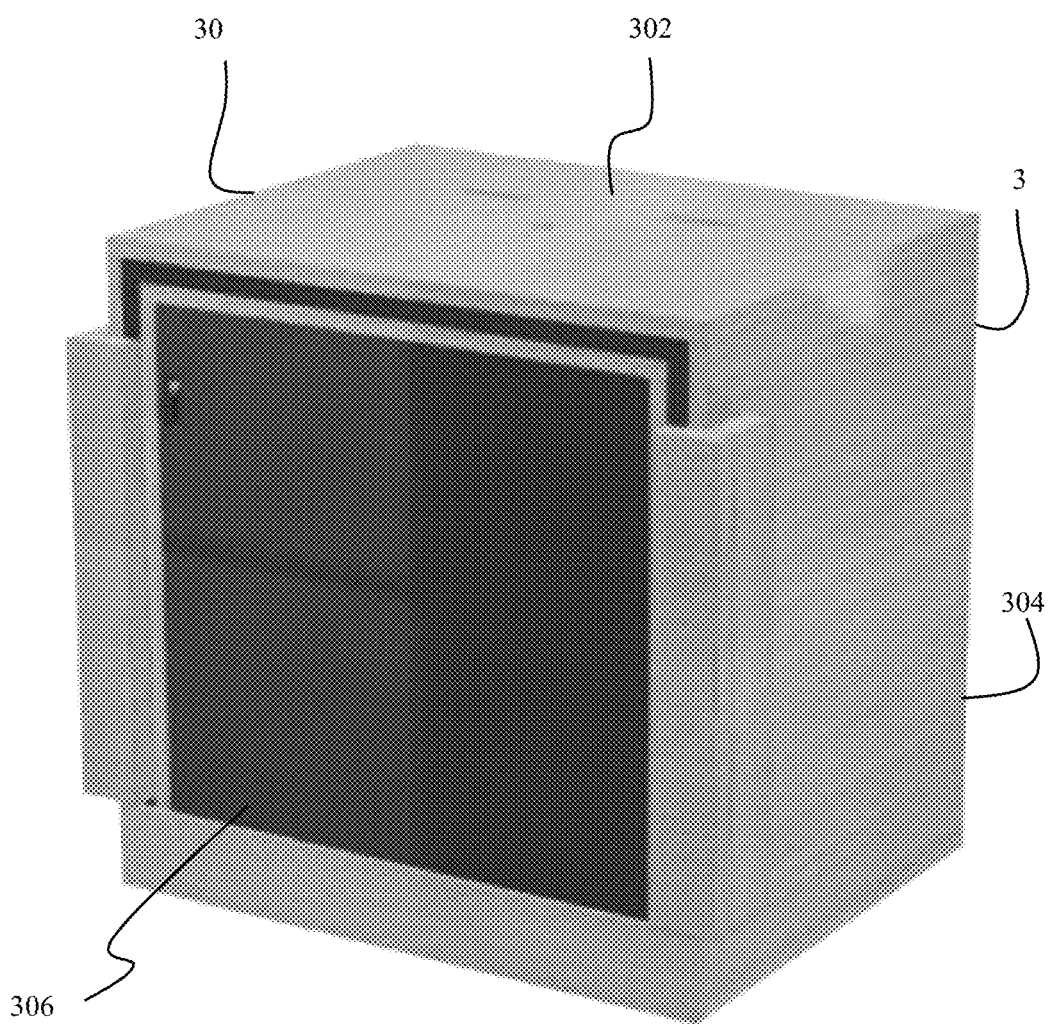
FIG. 2 shows the dispenser assembly, according to one illustrative embodiment.

FIG. 2 is a bottom isometric view the dispenser assembly, according to one illustrative embodiment. The dispenser assembly 3 comprises a rectangular housing 30 sized and dimensioned to be mounted onto a JPAD. The housing 30 comprises a top surface 302, side surfaces 304 and a detachable door 306. The detachable door 306 is held in place using an electro-mechanical latch. A carriage bolt is mounted on the top surface 302. A skid is secured on each of the distal end of the opposing side surfaces 304. The housing 30 defines an interior cavity 308.

Advantageously, the housing 30 may be deployed at the maximum cruise altitude for the transport aircraft thereby reducing the aircraft signature during aerial resupply missions. The interior cavity 308 of the housing 30 is capable of providing an operable environment for the UAVs 5 in the extreme external conditions present at these cruise altitudes of aircraft. For example, a C-130 transport aircraft cruises at altitudes up to 24,000 feet (ft) wherein the ambient temperature is approximately −35 degrees Celsius (C). These temperatures degrades the performance of lithium polymer batteries due to low temperatures and the low air density denies quadcopter flight.

Accordingly, the housing 30 is environmentally hardened to the shelter the UAVs 5 and payloads from the external environment until it reaches an allowable temperature for release. The housing 30 comprises a layer of foam insulation 310 between two layers of plywood 312. In one embodiment, the foam insulation 310 is approximately 1 inch (in) thick with an R-value of approximately 4.6. For example, the foam insulation 310 may be a polystyrene rigid foam insulation sheet. In this embodiment, each plywood board is approximately 0.5 in thick. The detachable door 36 is formed from the same foam insulation.

The interior cavity 308 further comprises a heating system 314. In one embodiment, heating system 314 emits at least 50 watts (W) of power.

Within the interior cavity 308, the dispenser assembly 3 further comprises a storage and release assembly 7, a control subsystem 8 and a power subsystem 9.

The power subsystem 9 comprises a power source, such as a lithium polymer battery, which provides power to the control subsystem and electronic components of the storage and release assembly.

The control subsystem 8 comprises a microcontroller, such as an Arduino microcontroller. The microcontroller actuates the storage and release assembly 7 of the dispenser assembly 3. The microcontroller may further log data corresponding to the operation of the airborne delivery system.

The control subsystem 8 may further comprise a wireless transceiver in communication with the microcontroller for receiving and transmitting information. The wireless transceiver may receive control signals, such as a release signal, from a remote operator and the microcontroller may send control signals, accordingly.

Figure 3:
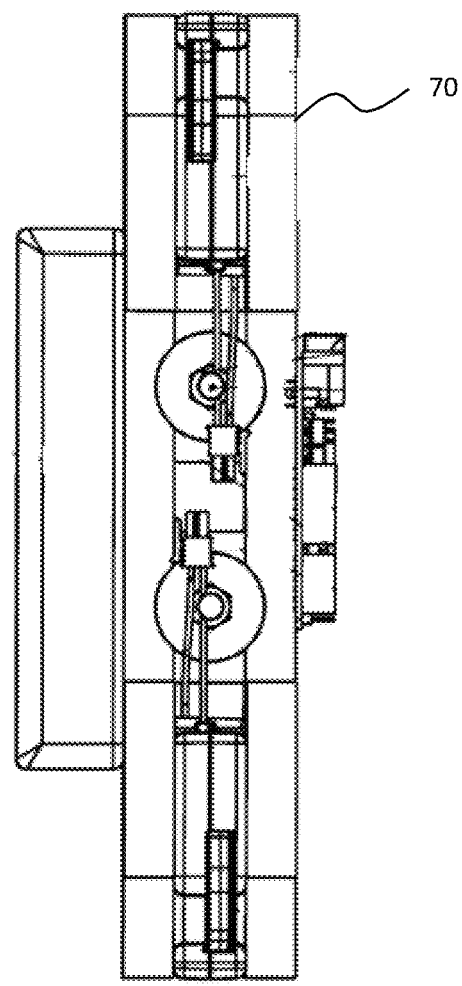
FIG. 3 shows a latch assembly of the dispenser assembly, according to one illustrative embodiment.
Figure 4:
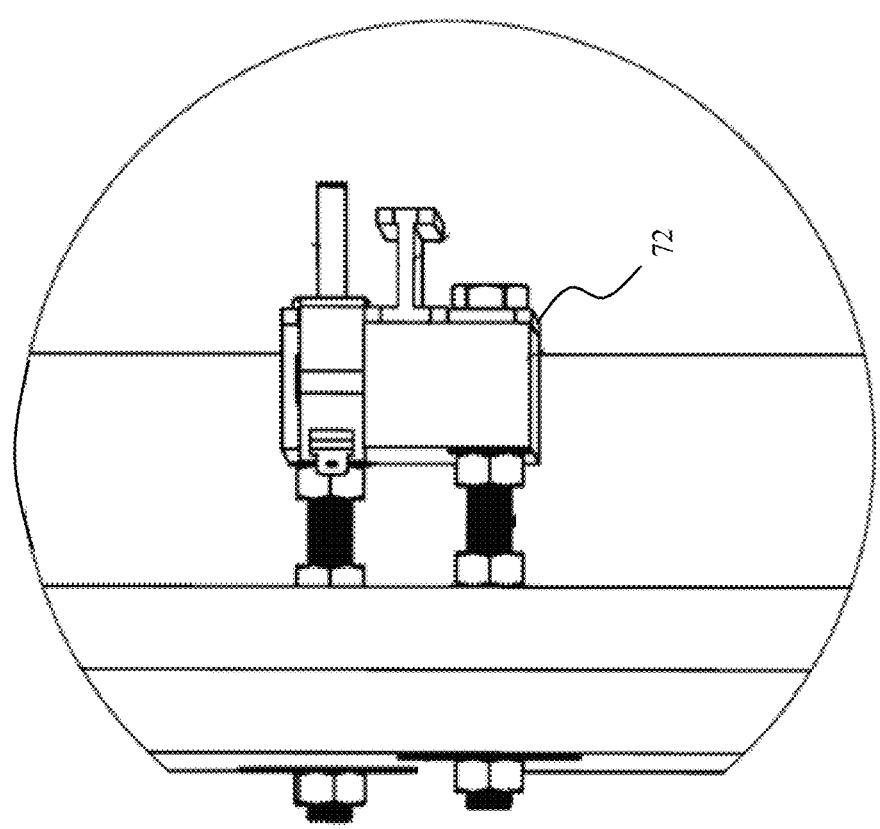
FIG. 4 shows the release assembly of the dispenser assembly, according to one illustrative embodiment.

FIG. 3 shows a latch assembly of the dispenser assembly, according to one illustrative embodiment. FIG. 4 shows the slider assembly of the dispenser assembly, according to one illustrative embodiment. The storage and release assembly 7 further comprises a latch assembly 70 and a slider assembly 72. The slider assembly 72 supports the UAVs 5 within the dispenser assembly 3 and retains them in a loaded position until released by the latch assembly 70. The latch assembly 70 releases the UAVs 5 from the dispenser assembly 3 upon receiving a control signal from the control subsystem 10.

The latch assembly 70 is mounted to a top interior surface of the interior cavity 308 of the housing 30. The latch assembly 70 shown is a mechanical latch 70. When a UAV 5 is inserted into the dispenser, the mechanical latch 70 grasps a latch rod 510 on the UAV 5 with an audible click. In alternative embodiments, the latch assembly 70 may be an electromagnetic latch, a friction latch or some other mechanism capable of selectively retaining a UAV. In alternative embodiments, the control subsystem 10 and power subsystem 12 may be mounted on the latch assembly 70.

Each UAV 5 is supported at all four corners by the slider assembly 72 and held in place by the latch 70. The slider assembly 72 interfaces with a corresponding link block of the UAV. The link block and the slider assembly 72 slidingly interface with each other. The slider assembly 72 precludes the need for any divider between the UAVs 5 in the dispenser as they prevent the UAVs 5 from interfering with each other.

Figure 5:
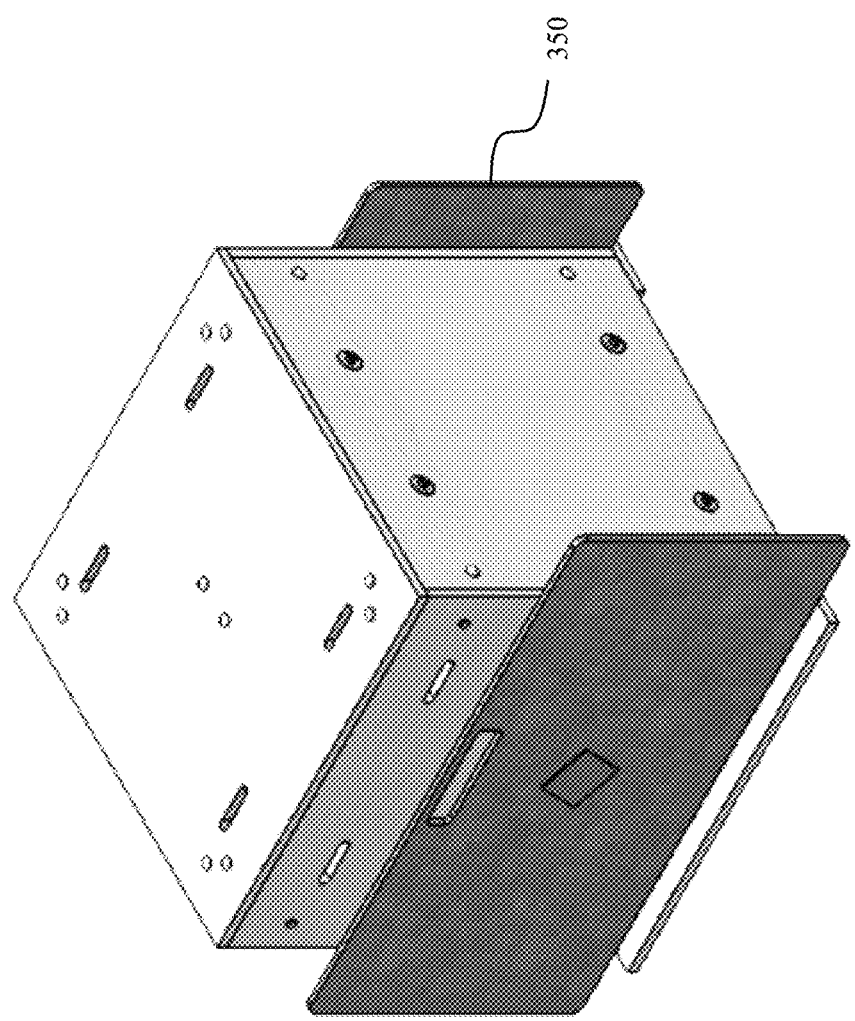
FIG. 5 shows the dispenser assembly with mounting hardware, according to one illustrative embodiment.

FIG. 5 shows the dispenser assembly with mounting hardware, according to one illustrative embodiment. In a rigging configuration, weighted plates 350 are attached to opposing sides of the dispenser to weigh the system for better JPADS flight performance. The JPADs parafoil, AGU and cardboard spacer are all strapped directly on top of the dispenser system.

Figure 6:
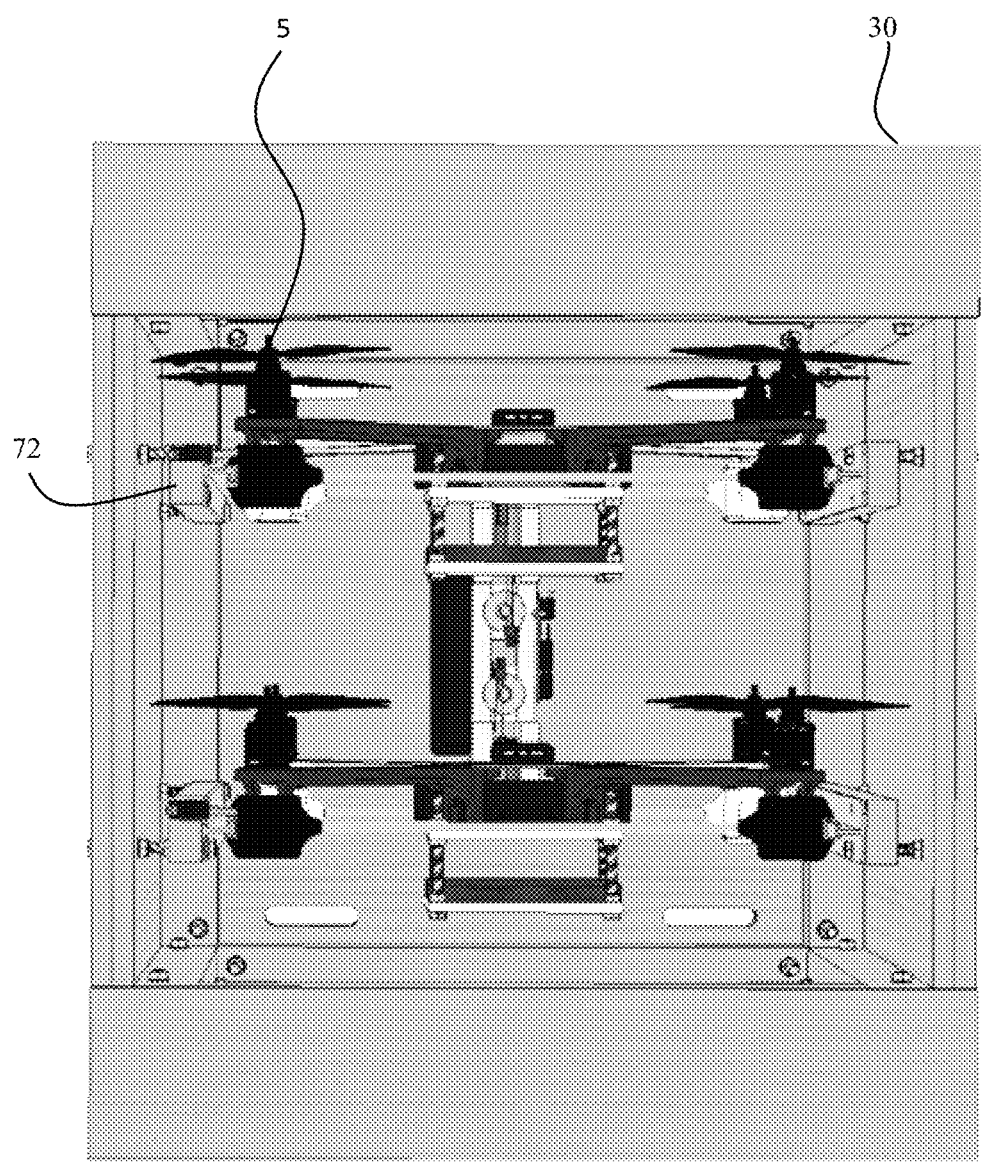
FIG. 6 shows a partial cutaway view of the dispenser assembly in a loading configuration with two unmanned aerial vehicles, according to one illustrative embodiment.
Figure 8:
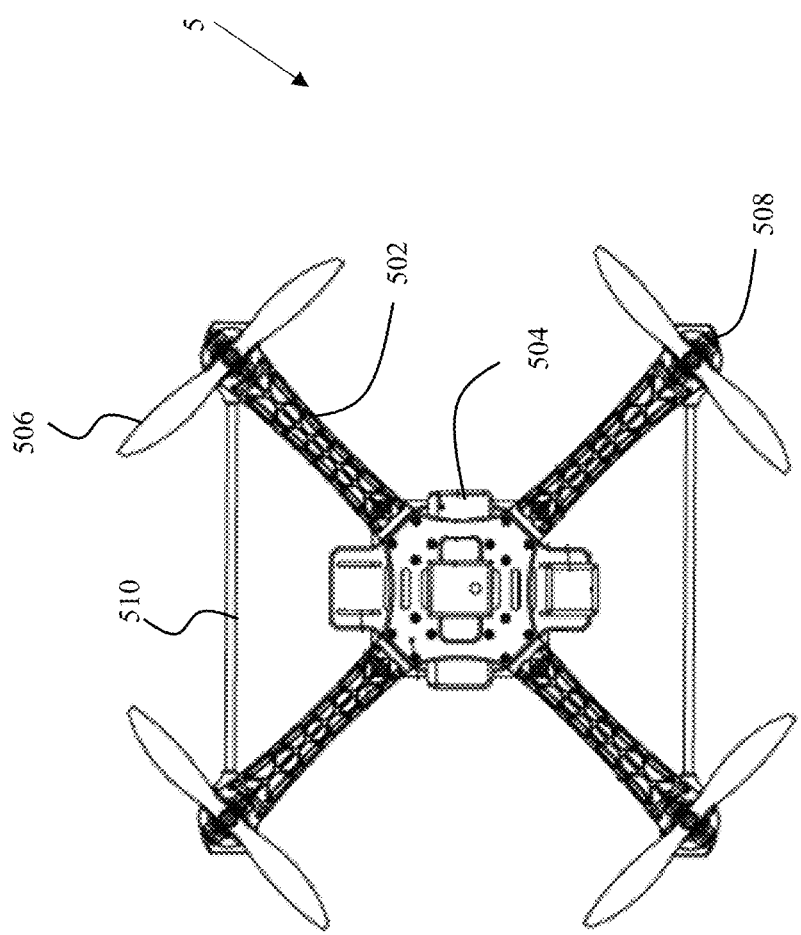
FIG. 8 is a top view of the unmanned aerial vehicle, according to one illustrative embodiment.

FIG. 6 shows a partial cutaway view of the dispenser assembly in a loading configuration with two unmanned aerial vehicles, according to one illustrative embodiment. FIG. 8 shows a partial cutaway view of the dispenser assembly in a loading configuration with two unmanned aerial vehicles, according to one illustrative embodiment. In the embodiment shown, the UAVs 5 are arranged in a vertical stack. In alternative embodiments, the UAVs 5 may be arranged in a vertical stack in which UAVs 5 are stacked on top of each other and released from the bottom or arranged in vertical drawers in which the dispenser 30 comprises multiple drawers that would open via actuation thereby providing individual platforms for each drone to take-off from.

Figure 7:
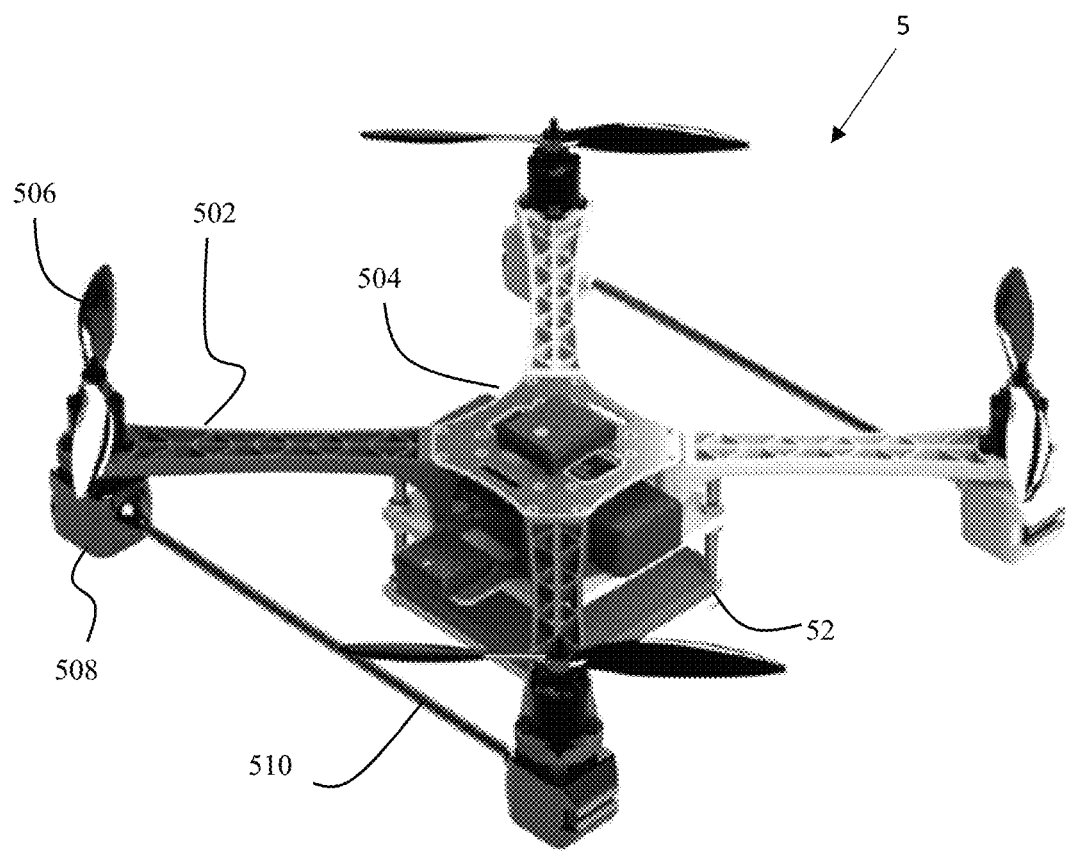
FIG. 7 shows an unmanned aerial vehicle of the airborne supply system, according to one illustrative embodiment.
Figure 9:
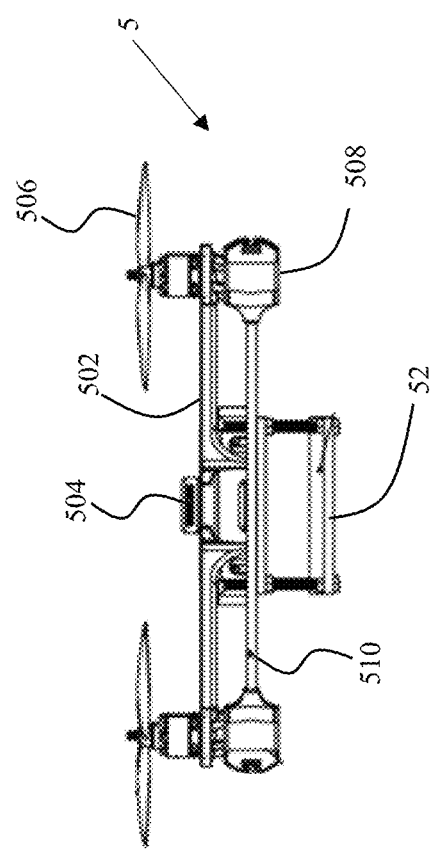
FIG. 9 is a side view of the unmanned aerial vehicle, according to one illustrative embodiment.

FIG. 7 shows an unmanned aerial vehicle of the airborne supply system, according to one illustrative embodiment. FIG. 8 is a top view of the unmanned aerial vehicle, according to one illustrative embodiment. FIG. 9 is a side view of the unmanned aerial vehicle, according to one illustrative embodiment. The UAV 5 is a quadcopter-style UAV having four propeller arms 502 extending radially from a central housing 504. At the distal end of each propeller arm, a propeller 506 is mounted to the top surface of the arm 502. A link block 508 for interfacing with the slider assembly 72 of the dispenser 30 is mounted to the bottom surface of the arm 502. A first latch rod 510 and a second latch rod 510 extend between link blocks 508 on opposing sides. The latch rods 510 interact with the latch 70.

Figure 10A:
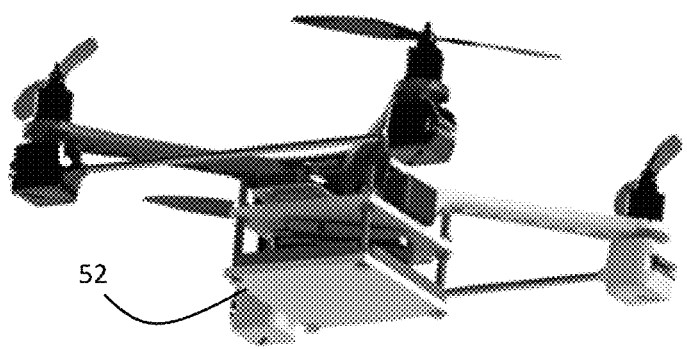
FIG. 10a shows the unmanned aerial vehicle with a supply load, according to one illustrative embodiment.
Figure 10B:
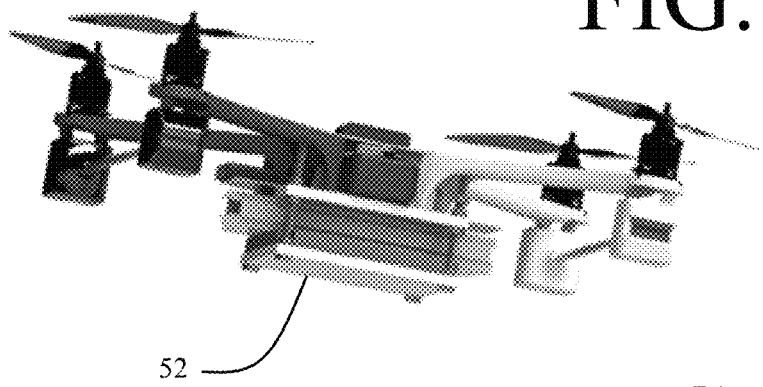
FIG. 10b shows the unmanned aerial vehicle with a supply load, according to one illustrative embodiment.

A central housing 504 is positioned in the center of the UAV 5. Control electronics are mounted to and housed within the central housing 504. A variable volume cargo bay assembly 52 extends below the central housing 504. The cargo bay assembly 52 may be selectively sized to accommodate loads of various sizes as needed. FIG. 10a shows the unmanned aerial vehicle with a supply load of a small package of blood, according to one illustrative embodiment. FIG. 10b shows the unmanned aerial vehicle with a supply load of a 30 round magazine, according to one illustrative embodiment.

Figure 11:
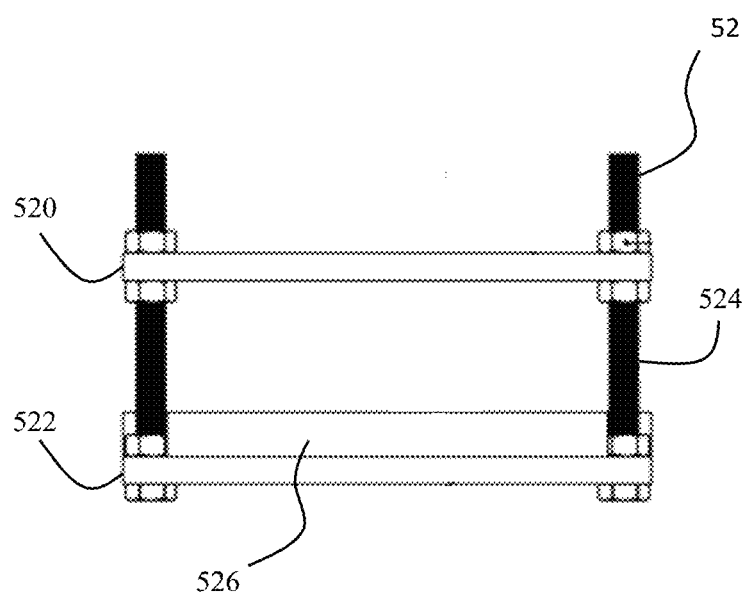
FIG. 11 shows a cargo bay assembly of the unmanned aerial vehicle, according to one illustrative embodiment.

FIG. 11 shows a cargo bay assembly of the unmanned aerial vehicle, according to one illustrative embodiment. The cargo bay assembly 52 comprises a top baseplate 520 and a bottom baseplate 522 connected by threaded rods 524 at each corner. The baseplates may be positioned along the threaded rods to size the cargo bay assembly 52 as desired. A foam pad 526 is mounted to the top of the bottom baseplate 522 to protect the contents of the cargo bay assembly 52. The threaded rods 524 extend above the top baseplate 520 and connect the cargo bay assembly 52 to the central platform 504 of the UAV 5.

Figure 12:
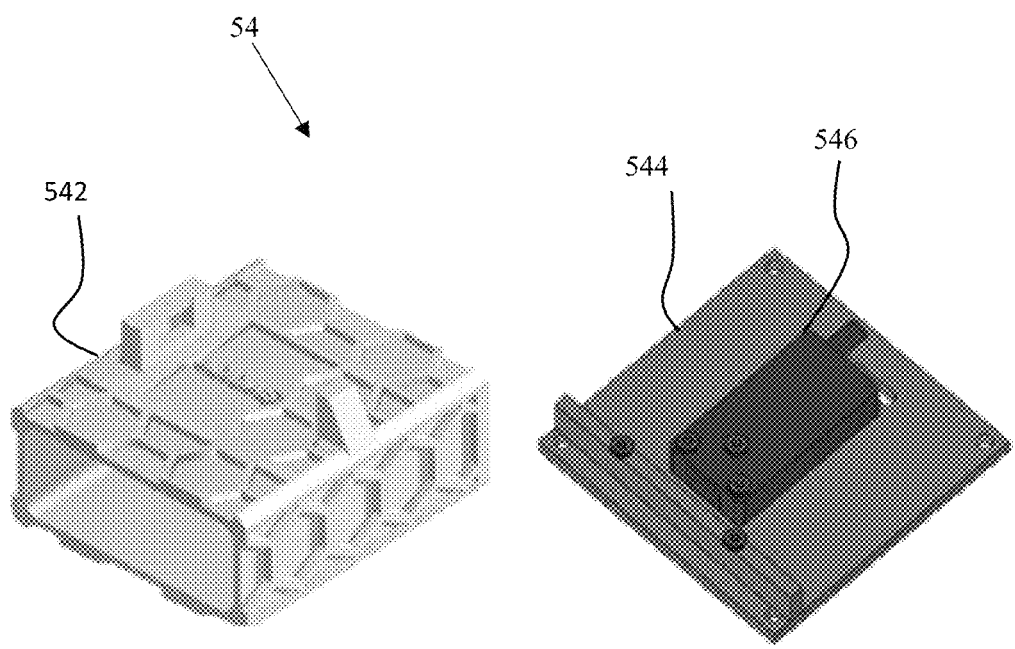
FIG. 12 shows a cargo bay assembly of the unmanned aerial vehicle, according to one illustrative embodiment.

FIG. 12 shows a cargo bay assembly of the unmanned aerial vehicle, according to one illustrative embodiment. In another embodiment, the cargo bay assembly 54 is releasable from the UAV 5. FIG. 12 shows a cargo bay assembly 54 which includes a 3D printed cargo bay 542 and utilizes a honeycomb structure to minimize weight while optimizing structural strength. The cargo bay assembly 54 further comprises a mounting plate 544 for connecting an electromechanical latch 546 which may be actuated to release the cargo bay assembly 54. In addition, the electro-mechanical latch 546 comprises a mechanical override mechanism to enable dynamic retasking of supplies.

Figure 13:
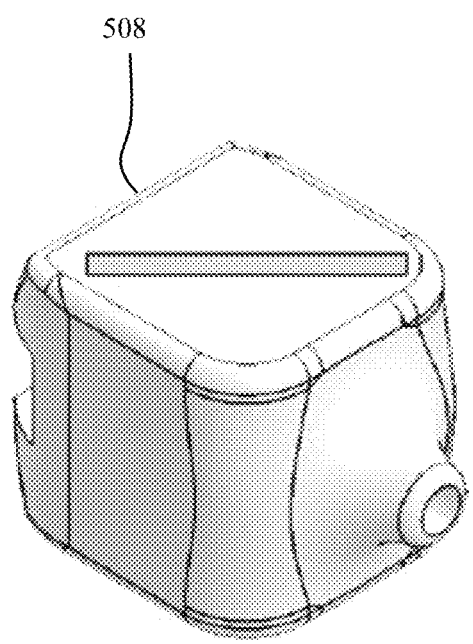
FIG. 13 shows a link block of the unmanned aerial vehicle, according to one illustrative embodiment.

FIG. 13 shows a link block of the unmanned aerial vehicle, according to one illustrative embodiment. Each link block 508 has a generally rectangular shape. One side of the link block 508 comprises a cutout defining an interface for interacting with the slider assembly 72. The cutout is sized and dimensioned to receive a corresponding protrusion of the slider assembly 72. The link block 508 further comprises a protrusion on an opposing side of the cutout. The protrusion defines a circular opening for receiving a latch rod 510. A top surface of the link block 508 comprises a rectangular opening for mating the link block 508 to the UAV 5.

Figure 14:
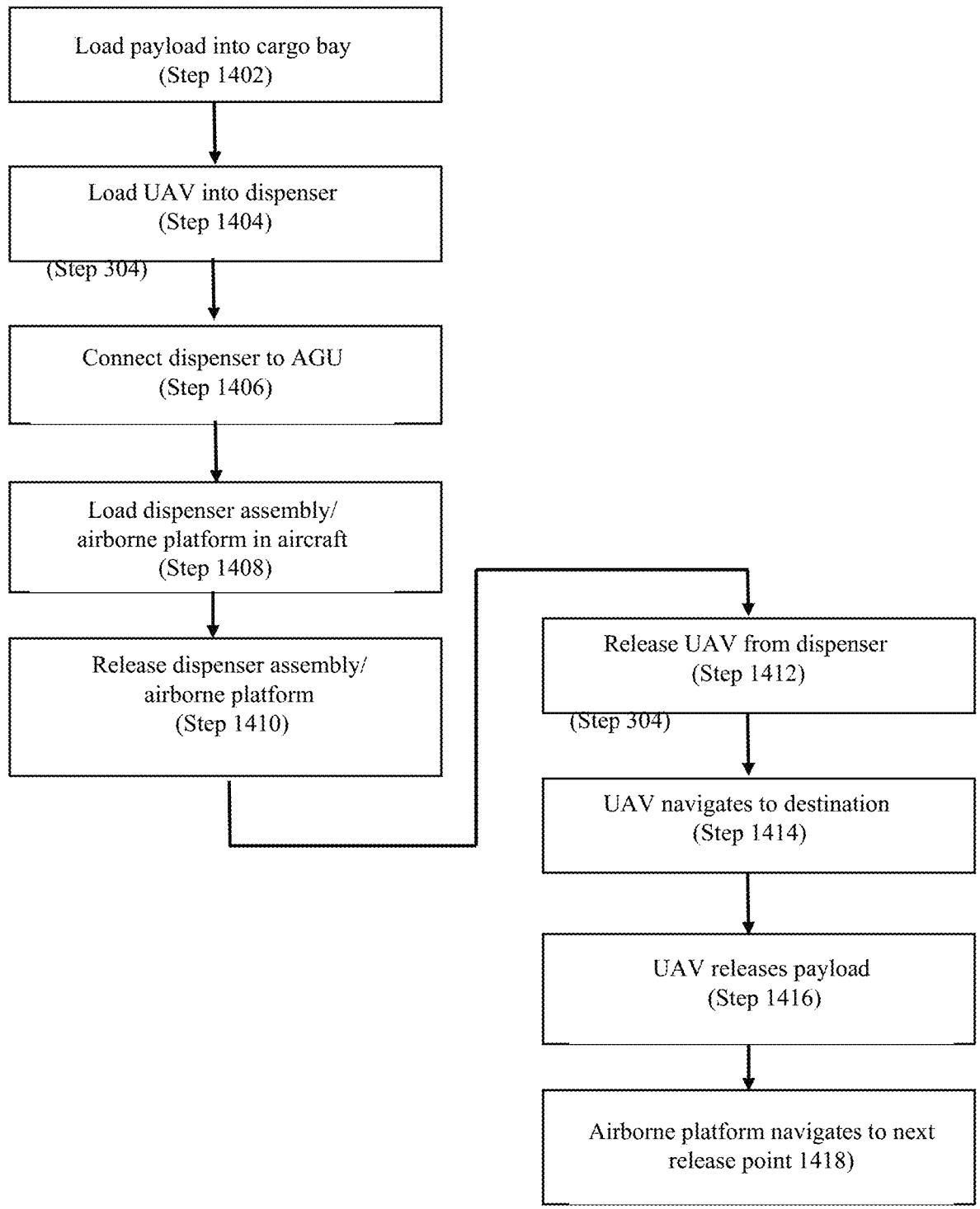
FIG. 14 is a flow chart illustrating a method for delivering supplies with an unmanned aerial vehicle released from an airborne platform, according to one illustrative embodiment.

FIG. 14 is a flow chart illustrating a method for delivering supplies with an unmanned aerial vehicle released from an airborne platform, according to one illustrative embodiment.

In step 1402, a payload is loaded into the cargo bay assembly of the UAV. The UAV 5 is then powered on.

In step 1404, one or more UAVs 5 are loaded into the dispenser assembly 3. To ensure that the UAVs 5 are properly loaded, the loader ensures that the latches 70 are engaged. The dispenser assembly 3 is then powered on which provides power to the control unit and the heating system. The detachable door 36 is then attached to the dispenser assembly 3.

In step 1406, the dispenser assembly 3 is connected to a JPAD AGU.

In step 1408, the JPAD with the connected dispenser assembly 3 is loaded into a transport aircraft and the transport aircraft flies to a release point.

In step 1410, the JPAD with dispenser assembly 3 is released from the transport aircraft and the AGU guides the JPAD canopy and dispenser to target grid.

In step 1412, the dispenser releases the UAV. In embodiments, a communication link is established with each UAV 5 prior to releasing that UAV. In embodiments, the dispenser receives an "arm" command prior to releasing the UAVs 5. In these embodiments, the dispenser may not release the UAVs 5 without first establishing a communication link with the UAVs 5 and/or receiving an "arm" command from a user. In other embodiments, these checks are not required. Once the JPAD is in the vicinity of the release point, the controller sends a command to disarm the door latch. The controller then sends a command to release the latch 70 restraining the UAV.

Advantageously, the controller sends the command to release the latch 70 autonomously.

In step 1414, the UAV 5 navigates toward destination. The UAV 5 slides out from its slot and through the opening in the dispenser. Upon falling out of the dispenser, the UAV 5 arms while in throw mode. Flight software running on the UAV 5 navigates the UAV 5 to the destination.

In step 1416, the UAV 5 releases payload. The flight software navigates the UAV 5 to within a threshold distance, such as plus or minus 5 meters, of the destination and then lowers altitude to within release distance, such as 1 meter off the ground. Distance to ground is sensed by the proximity sensor. Once the release distance is attained, the UAV 5 releases the payload. The UAV 5 then returns to a return point.

In step 1418, upon release of the UAV, the JPADS navigates to the next release point. Steps 1412-1416 are repeated until all of the UAVs 5 have been released.

Figure 15:
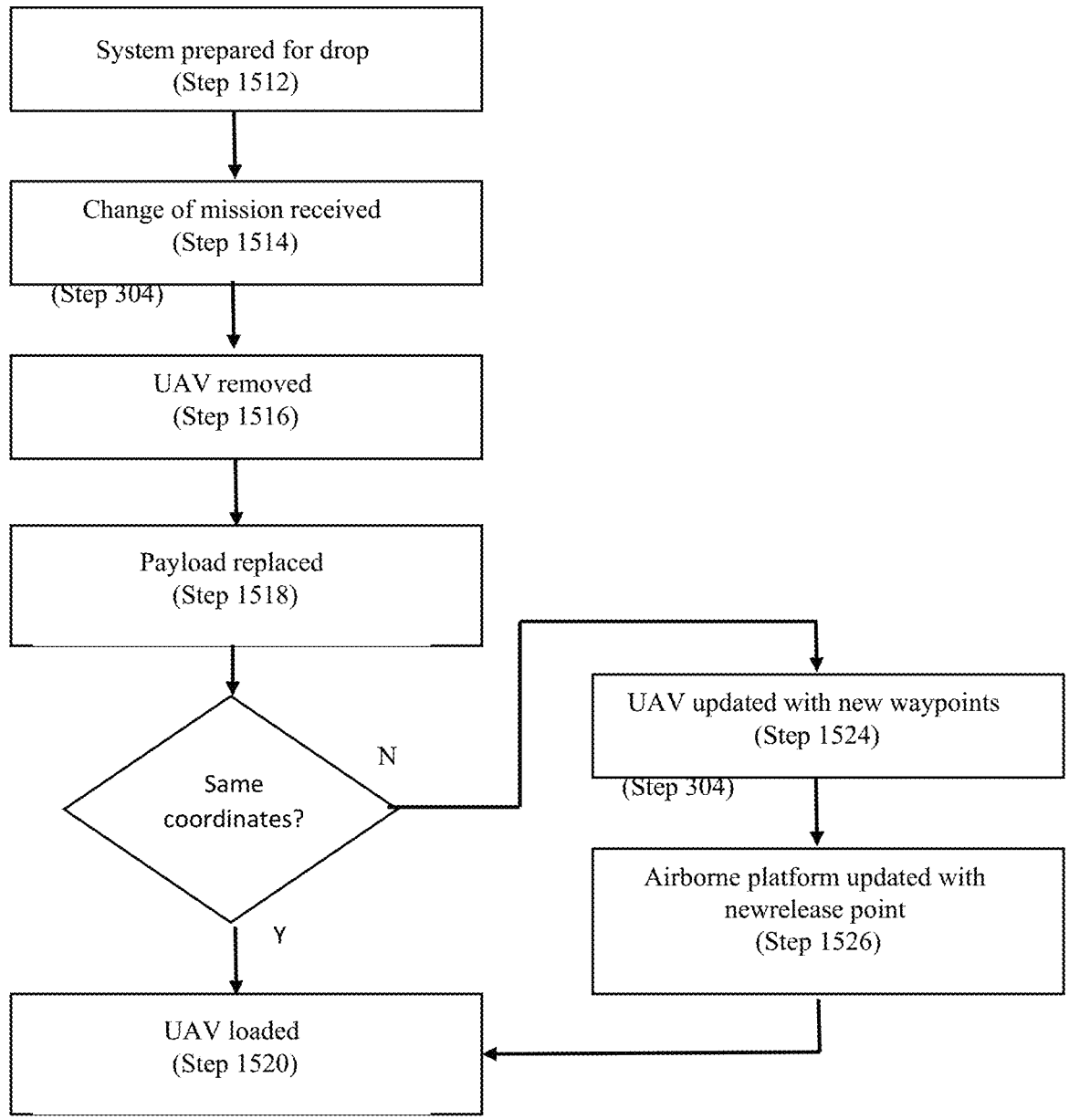
FIG. 15 is a flow chart illustrating a method for dynamically retasking an airborne delivery system, according to one illustrative embodiment.

FIG. 15 is a flow chart illustrating a method for dynamically retasking an airborne delivery system, according to one illustrative embodiment.

Dynamic retasking further advances the capabilities of a hasty resupply mission. In current aerial resupply missions, the payloads in the back of the aircraft are fixed upon take-off. As a result, the limiting factor to hasty resupply is length of time which passes from take-off to delivery to resupply. In a dynamic battlefield where supply requests can change in seconds, this current capability does not accomplish the mission. With dynamic retasking, a loadmaster in the aircraft can remove the UAV, detach the payload, replace it with the newly desired payload, and return the UAV 5 into the dispenser ready for delivery. As a result, the payloads in the aircraft still follow protocol while effectively responding to the changing battlefield environment on the ground.

In step 1512, the system is prepared for drop. For example, steps 1402-1408 of the method for delivering supplies, shown in FIG. 14, may be performed.

In step 1514, a change of mission is received. The change of mission may be received by the crew via radio. In alternative embodiments, the change of mission may be received by an autonomous loadmaster. The new payload and coordinate are confirmed.

In step 1516, the dispenser's door 36 is opened and the UAV 5 is removed.

In step 1518, the old payload is removed from the payload container and replaced with a new payload.

In step 1520, for UAVs 5 with the same coordinates, the UAV 5 is loaded into the dispenser and the door 36 is sealed.

In step 1524, for UAVs 5 without the same coordinates, the flight controller is updated with a new waypoint file.

In step 1526, the JPAD is updated with new coordinates for release points. The UAV 5 is then loaded into the dispenser and the door 36 is sealed.

While the invention has been described with reference to certain embodiments, numerous changes, alterations and modifications to the described embodiments are possible without departing from the spirit and scope of the invention as defined in the appended claims, and equivalents thereof.

What is claimed is:

1. An airborne supply system for releasing one or more unmanned aerial vehicles from an airborne platform, the airborne delivery system comprising:
    the airborne platform configured for being released from a transport aircraft and navigating to a release point;
    a dispenser connected to the airborne platform and further comprising a latch assembly and a slide assembly; and
    a plurality of quadcopters, each of said quadcopters having four propeller arms extending radially from a central platform housed within the dispenser and further comprising a link block for interfacing with the slide assembly to position the unmanned aerial vehicle within the dispenser and a latch rod selectively secured by the latch assembly such that upon the airborne platform navigating to the release point, the latch rod is released by the latch assembly and the unmanned aerial vehicle slides along the slide assembly until dispensed from the dispenser.

2. The airborne supply system of claim 1 wherein the airborne platform further comprises a steerable parachute and a global positioning system receiver.

3. The airborne supply system of claim 2 wherein the airborne platform is a Joint Precision Airdrop System.

4. The airborne supply system of claim 1 wherein the dispenser comprises a housing mounted on the airborne platform and further comprising a door detachably connected by an electro-mechanical latch.

5. The airborne supply system of claim 4 wherein the housing is formed of a layer of foam insulation between two layers of plywood and wherein an interior cavity of the housing further comprises a heating system.

6. The airborne supply system of claim 1 wherein the dispenser further comprises a control subsystem and a power subsystem.

7. The airborne supply system of claim 1 wherein the plurality of quadcopters are oriented vertically within the dispenser.

8. The airborne supply system of claim 1 wherein each quadcopter of the plurality of quadcopters comprises a link block on a bottom surface of each propeller arm and a latch rod extending between a pair of link blocks.

9. The airborne supply system of claim 1 wherein each quadcopter of the plurality of quadcopters further comprises a cargo bay assembly releasably connected to a bottom surface of the quadcopter.

10. An airborne supply system for releasing one or more unmanned aerial vehicles from a Joint Precision Airdrop System, the airborne delivery system comprising:
the Joint Precision Airdrop System configured for being released from a transport aircraft and navigating to a release point, the Joint Precision Airdrop System further comprising a steerable parachute and a global positioning system receiver;
a dispenser mounted to the Joint Precision Airdrop System and further comprising a housing for housing the one or more unmanned aerial vehicles with a door detachably connected by an electro-mechanical latch and further comprising a heater, a latch assembly mounted to a top surface of an interior cavity of the housing and a slide assembly comprising a first slider and a second slider, said first slider and second slider being mounted on opposing interior side surfaces of the interior cavity; and
one or more unmanned aerial vehicles housed vertically within the dispenser and further comprising four propeller arms extending radially form a central platform, a link block located under each propeller arm for slidably interfacing with the slide assembly to position the unmanned aerial vehicle within the dispenser, a latch rod extending between a pair of link blocks and selectively secured by the latch assembly such that upon the airborne platform navigating to the release point, the latch rod is released by the latch assembly and the unmanned aerial vehicle slides along the slide assembly until dispensed from the dispenser, and a cargo bay assembly releasably connected to a bottom surface of the unmanned aerial vehicle.

11. A method for delivering a payload comprising the steps of:
providing one or more unmanned aerial vehicles, each of the unmanned aerial vehicle comprising four propeller arms extending radially from a central platform, a link block located under each propeller arm, a latch rod extending between a pair of link blocks and a cargo bay assembly releasably connected to a bottom surface of the unmanned aerial vehicle;
loading a payload into the cargo bay assembly of an unmanned aerial vehicle;
providing a dispenser comprising a housing for housing the one or more unmanned aerial vehicles with a door detachably connected by an electro-mechanical latch and further comprising a heater, a latch assembly mounted to a top surface of an interior cavity of the housing and a slide assembly comprising a first slider and a second slider, said first slider and second slider being mounted on opposing interior side surfaces of the interior cavity;
loading the one or more unmanned aerial vehicles in a dispenser such that each of the link blocks slidably interfaces with the slide assembly to position the one or more unmanned aerial vehicles within the dispenser and the latch rod selectively secured by the latch assembly;
connecting the dispenser to a Joint Precision Airdrop System;
releasing the Joint Precision Airdrop System with the dispenser from a transport aircraft at a release point;
the Joint Precision Airdrop System navigating to a target grid;
releasing an unmanned aerial vehicle from the dispenser by detaching the door from the housing and releasing the latch assembly;
the unmanned aerial vehicle navigating toward a destination;
releasing a payload from the unmanned aerial vehicle.

12. The method of claim 11 wherein the step of the Joint Precision Airdrop System navigating to a target grid further comprises the steps of the Joint Precision Airdrop System autonomously controlling a navigable parachute according to a position received by a global positioning service receiver.

13. The method of claim 11 wherein the step of releasing an unmanned aerial vehicle from the dispenser by detaching the door from the housing and releasing the latch assembly further comprises the steps of a control subsystem of the dispenser autonomously sending a control signal to release the latch assembly based on a position received by a global positioning service receiver.

14. The method of claim 13 wherein the step of releasing an unmanned aerial vehicle from the dispenser by detaching the door from the housing and releasing the latch assembly further comprises the step of either successfully establishing a communication channel between a user and the unmanned aerial vehicle or the dispenser receiving an arm signal from a user.

15. The method of claim 11 wherein the step of releasing a payload from the unmanned aerial vehicle further comprises the step of the unmanned aerial vehicle navigating to within a threshold distance of the destination and lowering to an threshold altitude as sensed by a proximity sensor.

16. The method of claim 11 further comprising the steps of:
receiving a mission change;
opening the dispenser and removing the unmanned aerial vehicle;
replacing an old payload with a new payload;
updating the unmanned aerial vehicle with a new flight plan;
re-inserting the unmanned aerial vehicle into the dispenser;

updating the Joint Precision Airdrop System with a new release point coordinate.

\* \* \* \* \*